(12) United States Patent
Ootsuka

(10) Patent No.: US 6,433,793 B1
(45) Date of Patent: Aug. 13, 2002

(54) SCROLLING SYSTEM OF A DISPLAY IMAGE

(75) Inventor: Katsuhiro Ootsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/291,310

(22) Filed: Apr. 15, 1999

(30) Foreign Application Priority Data

Apr. 24, 1998 (JP) .......................................... 10-131452

(51) Int. Cl.[7] .................................................. G09G 5/00
(52) U.S. Cl. ...................................... 345/684; 672/158
(58) Field of Search .......................... 340/825; 345/156, 345/157, 184, 672, 684, 685, 687, 158

(56) References Cited

U.S. PATENT DOCUMENTS

| 5,554,980 | A | * | 9/1996 | Hashimoto et al. | ......... | 340/825 |
| 5,602,566 | A | * | 2/1997 | Motosyuku et al. | ........ | 345/156 |
| 5,757,360 | A | * | 5/1998 | Nitta et al. | .................. | 345/156 |
| 6,072,467 | A | * | 6/2000 | Walker | ........................ | 345/157 |
| 6,160,540 | A | * | 12/2000 | Fishkin et al. | .............. | 345/184 |
| 6,208,328 | B1 | * | 3/2001 | Kawachiya et al. | ......... | 345/157 |
| 6,243,074 | B1 | * | 6/2001 | Fishkin et al. | .............. | 345/156 |

FOREIGN PATENT DOCUMENTS

| JP | 59-40116 | | 3/1984 |
| JP | 59040116 | | 3/1984 |
| JP | 1982000149909 | * | 3/1984 |
| JP | 07134641 | | 5/1995 |
| JP | 7-271505 | | 10/1995 |
| JP | 1994000059147 | * | 10/1995 |

* cited by examiner

Primary Examiner—Matthew Luu
Assistant Examiner—Cam Truong
(74) Attorney, Agent, or Firm—Whitham Curtis & Christofferson, PC

(57) ABSTRACT

A system of scrolling displayed letters of a portable terminal device which is markedly improved in scrolling operations. Letters displayed in the display unit are scrolled upon shaking the portable telephone in the shaking direction detected by a shake movement detection device.

10 Claims, 4 Drawing Sheets

SEQUENCE OF LETTERS

IN CASE OF SHAKING IN DIREDCTION (1) SHOWN IN FIG.1

SEQUENCE OF LETTERS

IMAGE AREA PROJECTED BY A DISPLAY

SCROLLING SYSTEM OF A DISPLAY IMAGE

FIELD OF THE INVENTION

The present invention relates to an image scrolling system of a display device, more particularly to the image scrolling system preferable for use in a portable terminal device.

DESCRIPTION OF THE RELATED ART

According system for scrolling letters displayed on a screen of a display device has been employed in a portable terminal device for the purpose of shifting displayed letter sequence(s) up and down or right and left and totally displaying all of the letter sequences on a relatively narrow screen space of a display unit (made up of LCD and the like) due to smallness of the device.

There is used now a scrolling system of displaying letter sequences line by line every time by pushing down an up- or down-scrolling button provided on, e.g., a portable telephone.

As an image-displaying and controlling device intended to scroll images displayed on a screen of a display unit by simple operation, for example, Japanese Patent Kokai Publication JP-A-7-271505/1995 discloses a formulation equipped with scrolling means of changing images displayed on a display screen corresponding to an acceleration detected by acceleration detection means.

SUMMARY OF THE DISCLOSURE

However, the aforementioned conventional portable telephone has the following problem.

In the portable telephone, scrolling is done by finger's action. Thus operation on a scrolling button by single hand is difficult to manage. In most cases of using the portable telephone, the button is operated by the thumb when the portable telephone is held by a single hand. Especially, in case of scrolling with an up- or down-scrolling key, such button operation as to push down the up- or down-scrolling key by the thumb is very burdensome.

Accordingly, the present invention has been made in consideration of the above problem. Its object is to provide a novel scrolling system of displayed letters markedly improved in scrolling system of displayed letters in a portable telephone terminal device.

In order to solve the above problem, a scrolling system of the present invention for scrolling displayed letters features that letters displayed on a display unit are scrolled in a direction detected by shake movement detection means upon shaking the whole device.

Typically, there is provided a scroll controlling system of a display image as set forth in claim 1, 2 or a portable terminal device of claim 7. Other features of the present invention are mentioned in the dependent claims and other claims. The description thereof is incorporated herein by reference. Generally, the detecting shaking direction of the device is carried out by detecting, upon shaking the device, successive contacts of the movable member to one electrode and another electrode disposed in mutually opposite directions of said movable member. The electrode is switched over upon contact of said movable member. At least one electrode is formed as an electrode unit of a pair of electrodes which are switched over upon contact of said movable member.

PREFERRED EMBODIMENTS OF THE INVENTION

Generally, the features of the dependent claims relate to the preferred embodiments of the present invention.

Figure 1:
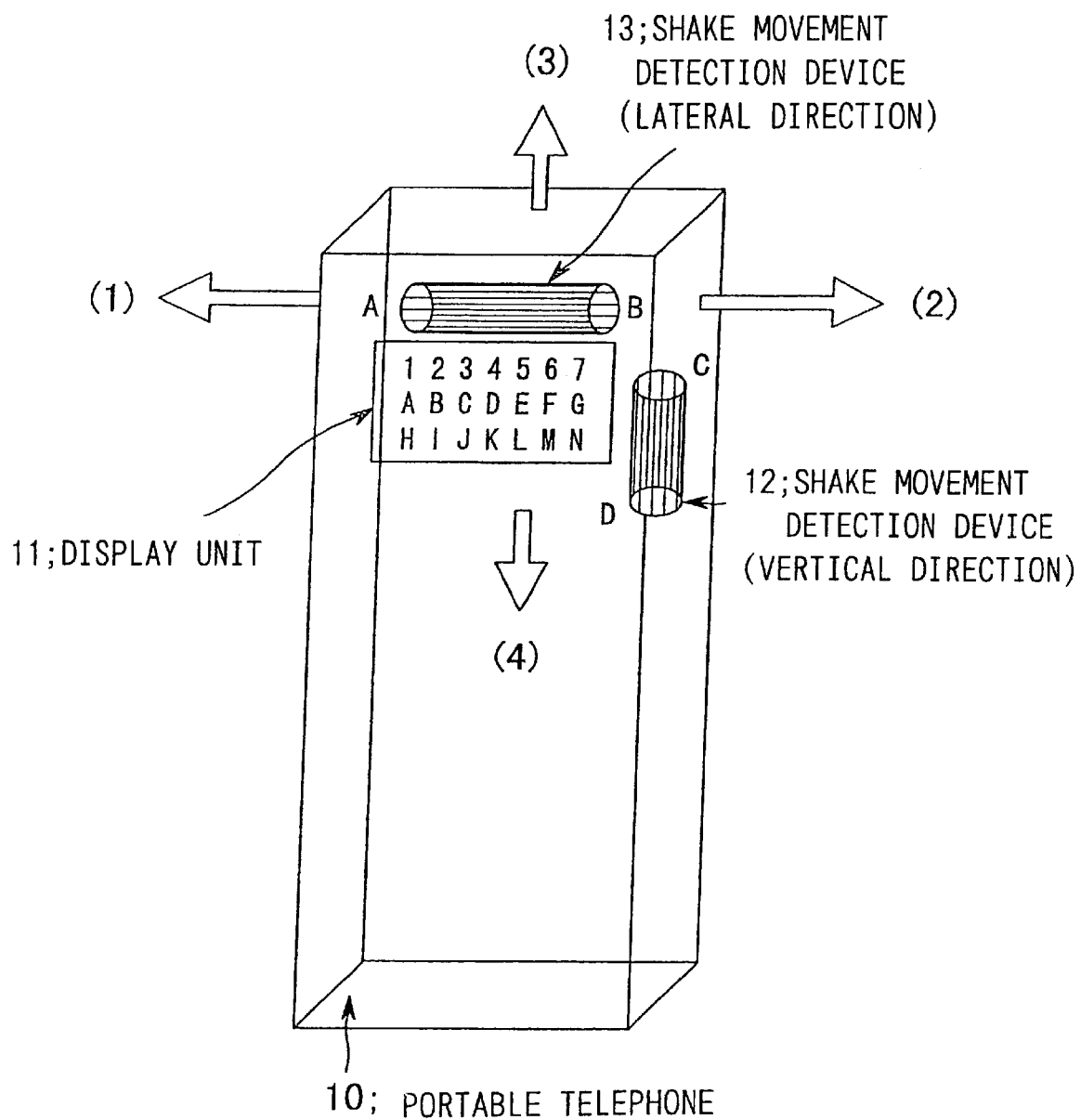
FIG. 1 is a view showing the constitution of an example of the present invention.

An embodiment of the present invention will be explained as follows. The present invention has the following preferred embodiment. Referring to FIG. 1, shake movement detection means 13 (installed in the lateral direction maybe termed as "shake movement detector") detects a shake movement in the sequence of from B to A in case of shaking a portable telephone 10 in the lateral (horizontal) direction (1) followed by stopping. This results in scrolling from A to B of letters displayed on a screen of a display unit 11. Similarly, shake movement detection means 12 (installed in the vertical direction) detects a shake movement in the sequence of C to D in case of shaking the portable telephone 10 in the vertical direction (4) followed by stopping to cause scrolling, from C to D, of the letters displayed on the screen of the display unit 11.

The above procedure makes it possible to scroll the letters displayed on the screen of the display device 11 without any button operation, and thereby contribute to the improvement in scrolling operations.

In an embodiment of the present invention, a timer may be included for controlling electric power of the above display unit to turn off upon detecting that there is neither shake movement detected by any of the above shake movement detection means nor operation of scrolling button(s) during a predetermined period of time.

Further, in an embodiment of the present invention, the shake movement detection means, details of which will be explained in the following example, preferably includes a cylinder, a cylindrical (columnar) electrode received inside the cylinder at both ends of the same retained by elastic members such as springs or the like, each pair of electrodes directly fixed inside the cylinder to both ends of the same, and signal generation circuits each providing a shake movement detection signal for each electrode pair of the two electrode pairs, so as to output the shake movement detection signal through the other electrode of one electrode pair of the electrode pairs.

When the portable telephone is shaken in one direction (e.g., direction (1) of B→A illustrated in FIG. 1) and then stopped, the cylindrical electrode in the cylinder electrically connects at first to one pair of electrodes (B in FIG. 1) fixed inside the cylinder opposite to the above shaking direction, and then to the other pair of electrodes (A in FIG. 1) to output the shake movement detection signals. By the output sequence of these shake movement detection signals, the shaking direction of B→A can be detected.

In the embodiment of the present invention, setting can be made so as to suppress generation of subsequent shake movement detection signals during a predetermined period of time if once the shake movement detection signal(s) has been output, and to detect first shaking direction only even when the cylindrical electrode in the cylinder repeatedly comes into contact with the electrodes disposed at both ends of the cylinder.

EXAMPLES

Examples of the present invention will be explained below in reference to the accompanying drawings to explain the aforementioned embodiment of the present invention more in detail.

FIG. 1 is a perspective view for explaining one example of the present invention. Referring to FIG. 1, which shows one example of the present invention, a shake movement detection device 13 is installed in a portable telephone 10 from side to side. In case of shaking the portable telephone 10 in the direction (1) and/or (2) (i.e., left or right), the shake movement detection device (lateral direction) 13 detects this direction.

In case of shaking the portable telephone 10 in the direction (3) or (4) (i.e., up or down), the shake movement detection device (vertical direction) 12 detects this direction.

A display unit 11 is a display device composed of small LCD etc. in the rectangular form for displaying characters (or letters). Letters to be displayed are controlled by a display driving circuit installed in the portable telephone 10.

Figure 2:
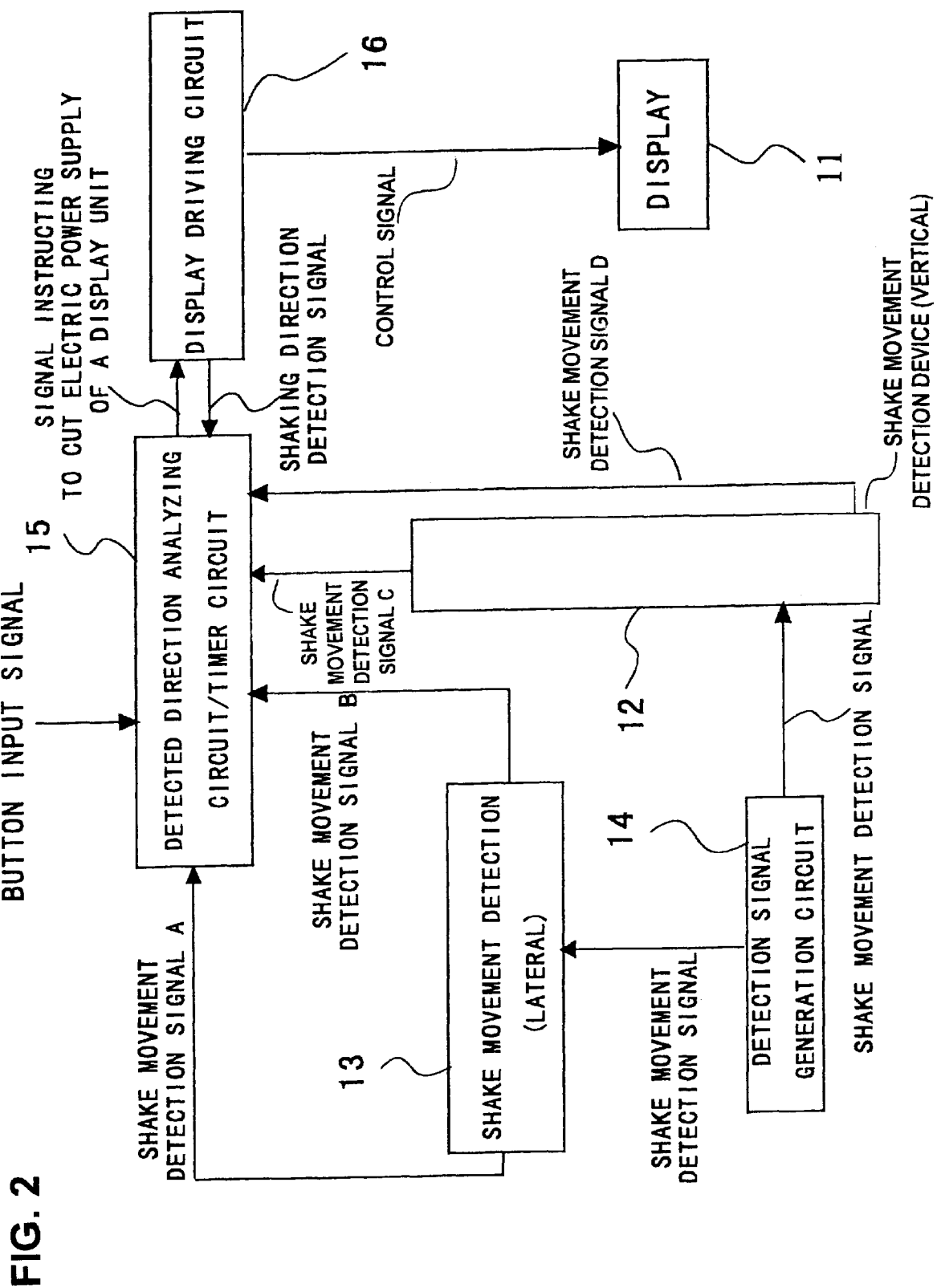
FIG. 2 is a block diagram showing the constitution of shake movement detection device and display driving device in an example of the present invention.

FIG. 2 is a block diagram showing an exemplary constitution of a system including horizontal and vertical shake movement. detection devices, display driving circuit and display (display unit) relating to the above explained example of the present invention.

Now, the shake movement detection devices employed in this example will be explained in reference to FIG. 2. Here, the vertical shake movement detection device 12 and the horizontal shake movement detection device 13 are essentially the same in structure. Thus, explanation of the shake movement detection devices will be made below by taking the horizontal shake movement detection device 13 only as an example.

Referring to FIG. 2, the shake movement detection device 13 or 12 generates a shake movement detection signal when it is subjected to shake of a certain direction. The shake movement detection signal is then supplied to a detected direction analyzing circuit 11.

A detected direction analyzing circuit 15 outputs a shaking direction detection signal into a display driving circuit 16.

The display driving circuit 16, after receiving the shaking direction detection signal, outputs a control signal for scrolling letter sequences displayed on a screen of the display 11 to the same display 11.

Next, the action of the shake movement detection system employed in an exemplary portable telephone of the present invention will be explained below.

Figure 3A:
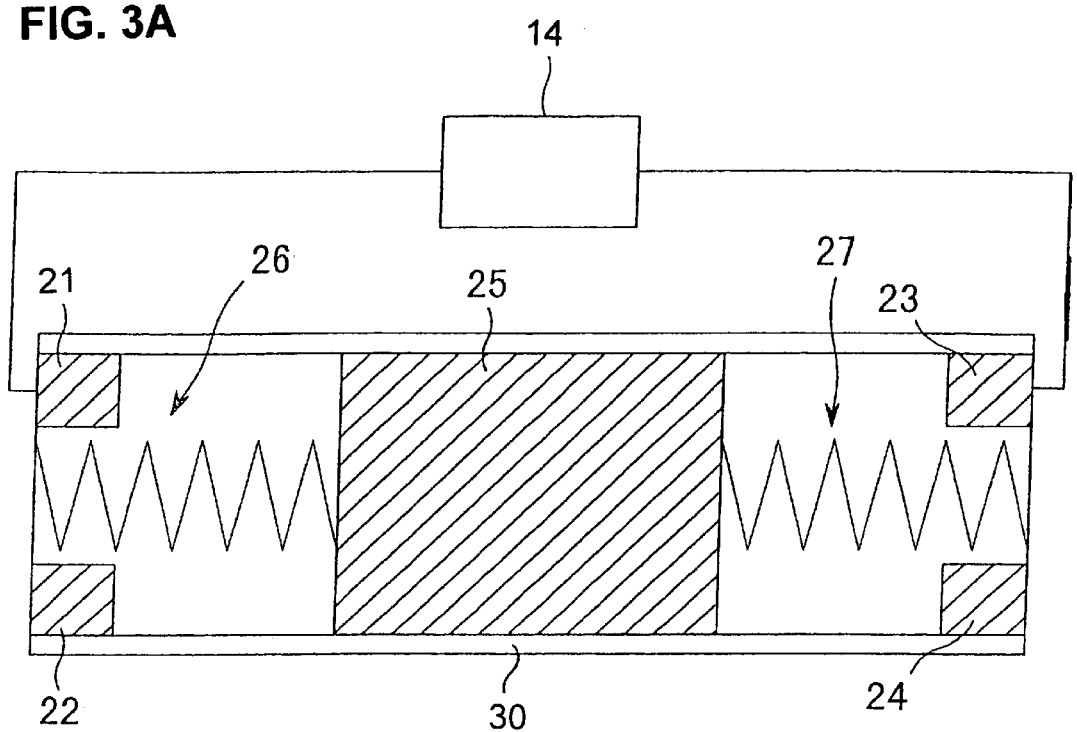
FIG. 3 is a view showing the constitution of shake movement detection device in an example of the present invention.

FIG. 3 shows a view of a constitution regarding an exemplary shake movement detection device of the present invention. Referring to FIG. 3(a), this shake movement detection device includes cylinder 30, fifth electrode 25 of a cylindrical form whose both ends are capped. The fifth electrode 25 and the springs 26, 27 are received in the cylinder 30. Both ends of the fifth electrode 25 are connected (or retained) with the springs 26, 27 within the cylinder 30.

First electrode 21 and second electrode 22 are provided at one end of the cylinder 30; and third electrode 23 and forth electrode 24 are provided at the other end.

The first electrode 21 and the third electrode 23 are connected to a detection signal generation circuit 14, respectively; as well as the second electrode 22 and the forth electrode 24, to a shaking direction detection circuit, respectively. The first electrode 21 and the second electrode 22 as well as the third electrode 23 and the forth electrode 24 are electrically open when there is no effective shaking, respectively.

Figure 3B:
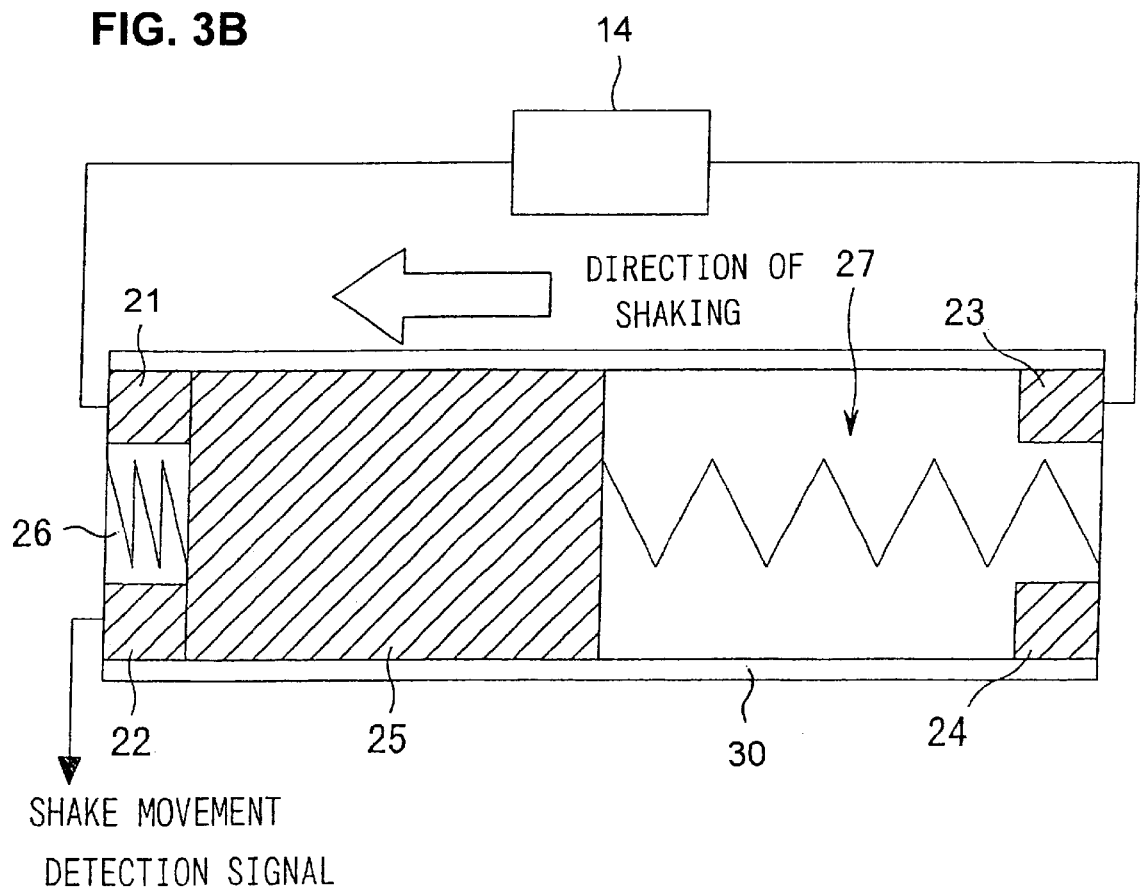
Figure 4A:
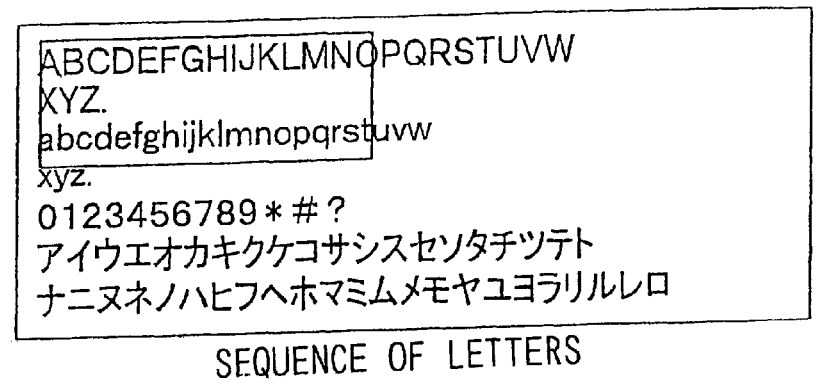
FIG. 4 is a view showing the scrolling states of a display in an example of the present invention.
Figure 4A:
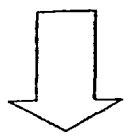
Figure 4B:
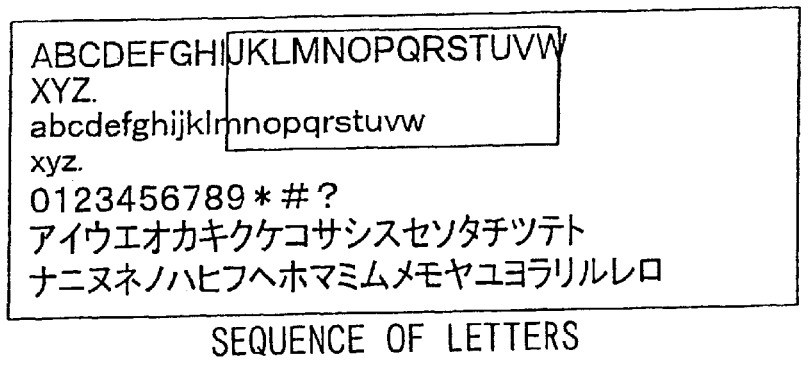
Figure 4B:

FIG. 3(b) shows the state that the shake movement detection device is under shaking. At this time, the fifth electrode 25 moves at first along a direction opposite to the shaking direction by an inertial force to come into contact with the third and forth electrodes 23, 24.

Thereby, the third and forth electrodes 23, 24 are rendered short-circuited. In this short-circuited state, the shake movement detection signal B is input into the detected direction analyzing circuit 15 from the forth electrode 24.

Next, upon stopping of the shake of the portable telephone, the fifth electrode 25 moves along the shaking direction by an inertial force to come into contact with the first and second electrodes 21, 22. Thereby, the first electrode 21 and the second electrode 22 are rendered short-circuited as shown in FIG. 3(b). In this short-circuited state, the shake movement detection signal A is input into the detected direction analyzing circuit 15 from the second electrode 22.

The fifth electrode 25 returns to the original state shown in FIG. 3(a) after the lapse of required time T by the action of the springs connected to the both ends.

When a user upon using a portable telephone shakes it in the direction (1), the lateral(horizontal) shake movement detection device is subjected to a shake along the direction of B→A. Consequently, short-circuiting occurs first at B side and then A side of the shake movement detection device, i.e., in the sequence of B to A.

Referring to FIG. 2, the shake movement detection device 13 outputs shake movement detection signals A and B in this sequence into the detected direction analyzing circuit 15.

After receiving these shake movement detection signals the detected direction analyzing circuit 15 outputs a signal which is a sign informing that there was a shaking along the direction B→A to the display driving circuit 16.

Under these conditions, setting is made so as to generate no signal for a period of time T after once outputting the direction detection signal. This setting makes it possible to detect initial shaking direction only for the above time T even when the fifth electrode repeatedly comes into contact with the both ends of the shake movement detection device by the springs.

As shown in FIG. 4, letters displayed in the display are scrolled to the left direction against the display unit. Namely, when a user shakes the portable telephone to the detectable direction for the shake movement detection system installed in the portable telephone, the shake movement detection system detects the shaking direction, and consequently, letter sequences are scrolled to the shaken direction.

Another example of the present invention will be explained below.

Referring to FIG. 2, the shake movement detection device outputs the shake movement detection signal to a timer circuit 15 in a second example of the present invention.

By applying this signal, electric power supply of the display may be cut during a period of time unnecessary to see the displayed images for reducing electric power consumption.

However, in the conventional portable telephone, letters are displayed so long as electric power is supplied for the display even when the portable telephone is not in use. The timer circuit 15 in the second example of the present invention plays an important role in supplying a signal instructing to cut off the power supply of the display on the condition that neither shake movement detection nor button input is performed during a given period of time.

The second example of the present invention has such an advantage that current consumption of the portable telephone can be reduced, and images can appear again on the screen of the display during a sleep time by simply shaking the portable telephone without pushing down scrolling buttons.

As understood from the foregoing description, there is provided a scroll controlling method of a display image.

The meritorious effects of the present invention are summarized below,

First effect of the present invention is to enable to simplify image scrolling operations in reading letters displayed on the screen of the display unit installed in the portable telephone.

This is because letters can be scrolled by simply shaking the portable telephone, and thereby the portable telephone can be operated by a single hand according to the present invention.

Second effect of the present invention is to enable to reduce the number of buttons installed in the portable telephone.

This is because the portable telephone itself can be used as a directional key and that buttons corresponding to the conventional directional keys can be removed according to the present invention.

Third effect of the present invention is to enable to reduce current consumption of the portable telephone and to realize that a displayed image can be revived during a sleep time without pushing down the buttons (image scrolling buttons) only by shaking the portable telephone.

This is because the constitution may be taken according to the present invention which is capable of cutting off electric power supply of the display unit after the lapse of a predetermined time from stopping shake movement detection and button input.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A portable telephone terminal device equipped with a display unit having a screen comprising:
   first and second shake movement detectors each for detecting the direction of shaking said terminal device parallel to or perpendicular to one axis of said screen,
   wherein said first and second shake movement detectors detect the shaking direction upon shaking of said portable telephone terminal device by a user, and
   wherein said display unit has a driving circuit which scrolls an image displayed on the screen along the shaking direction,
   wherein each of said first and second shake movement detectors comprise:
      a cylinder,
      an electrically conductive cylindrical member received within said cylinder with both ends of the same being retained by elastic members,
      first and second electrode pairs directly fixed to both ends of the cylinder, and
      a signal generation circuit providing a shake movement detection signal for each of said first and second electrode pairs.

2. The portable telephone terminal device as defined in claim 1, which further comprises:
   a timer for controlling electric power of said display unit to turn off upon detecting that there is neither shake movement detected by any of said first and second shake movement detectors nor operation of a scrolling button during a predetermined period of time.

3. The portable telephone terminal device as defined in claim 1, wherein upon halting said device immediately after shaking said device in one direction, said electrically conductive cylinder member is electrically connected at first to said first electrode pair disposed opposite to the direction of said shaking, and then connected to the second electrode pair to output said shake movement detection signals.

4. The portable telephone terminal device as defined in claim 1 wherein said signal generation circuit outputs said shake movement detection signal only for the first shaking direction even when said electrically conductive member repeatedly comes into contact wig said first and second electrode pairs.

5. A scroll controlling system, comprising:
   a display for displaying an image on a portable terminal device;
   a shake movement detector for detecting a shaking direction of said portable terminal device upon shaking of said portable terminal device; and
   control means for scrolling the display image, wherein a scroll direction is dependent on the shaking direction,
   wherein said shake movement detector comprises;
      a cylinder;
      an electrically conductive cylindrical member received within said cylinder with both ends of said electrically conductive cylindrical member being retained by elastic members;
      a first and second pair of electrodes fixed to first and second ends of the cylinder, respectively; and
      a signal generation circuit providing a shake movement detection signal for each electrode pair when said portable terminal device is shaken and said electrically conductive cylindrical member slides within said cylinder and makes contact with one of said first and second pairs of electrodes.

6. The system as defined in claim 5, wherein upon halting said portable terminal device immediately after shaking in one direction, said electrically conductive member is electrically connected at first to said first pair of electrodes positioned opposite to the direction of said shaking, and Then moved by said elastic members to be connected to said second electrode pair to output said shake movement detection signals.

7. The system as defined in claim 5 wherein the signal generation circuit only detects a first shaking direction during a period of time even when said electrically conductive member repeatedly comes into contact with said first or second pairs of electrodes.

8. A communication device comprising:
   a hand-held display for displaying information;
   a vertical motion detector positioned in said communication device parallel with a vertical axis of said display for outputting a shake signal when said display is shaken in a vertical direction;

a horizontal motion detector positioned in said communication device parallel with a horizontal axis of said display outputting a shake signal when said display is shaken in a horizontal direction;

a direction analyzing circuit for receiving said shake signals from said vertical motion detector and said horizontal motion detector for outputting a scroll direction signal; and display driving means for scrolling said information displayed on said display in a direction according to said scroll direction signal, wherein each of said vertical and horizontal motion detectors comprise:
  a hollow cylinder having a first and a second end;
  a first pair of contacts at said first end and a second pair of contacts at said second end;
  a slidable member elastically biased near a center position within said hollow cylinder,
  wherein when said display is shaken in a direction parallel to a central axis of said hollow cylinder said slidable member slides to one of said first and second ends to make contact with one of said first and second pair of contacts to output said shake signal.

9. A communication device as recited in claim 8, wherein said direction analyzing circuit output only one scroll direction during a predetermined time period even if said slidable member again slides into one of said first and second ends.

10. A communication device as recited in claim 9, further comprising:

a timer circuit for cutting power from said display if neither horizontal motion detector or vertical motion detector detect that said display has been shaken for a predetermined period of time.

* * * * *